Oct. 13, 1959 R. HAMILTON-PETERS ET AL 2,908,290
SHUT-OFF VALVE
Filed Jan. 31, 1956
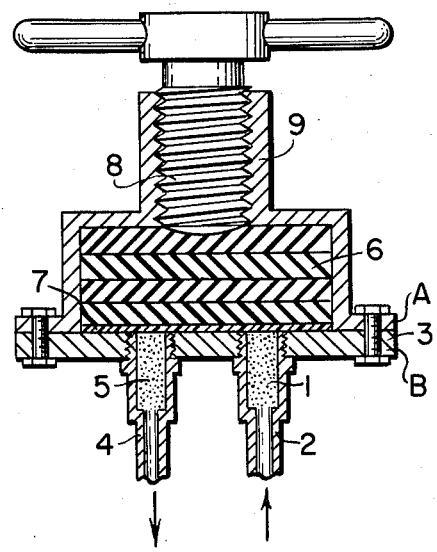
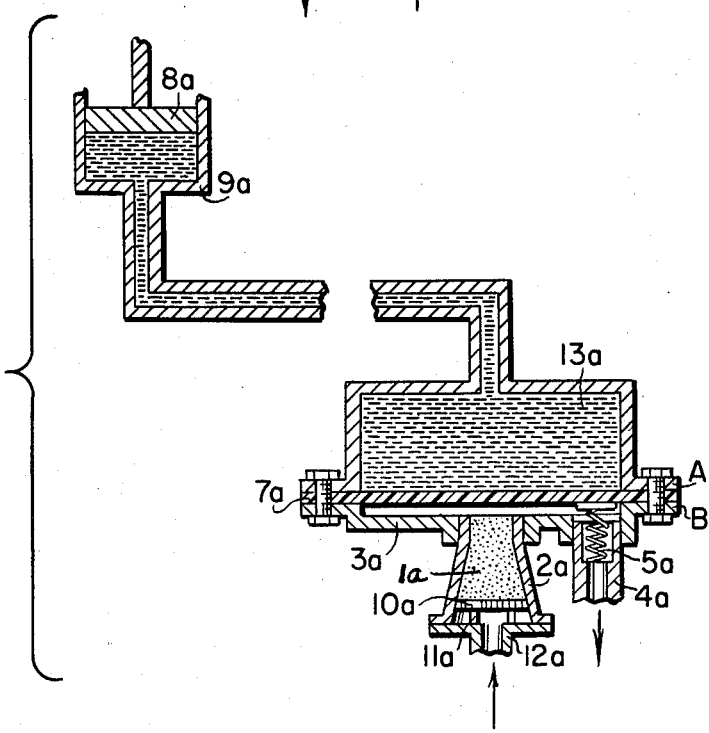
INVENTORS
Rodney Hamilton-Peters
Thomas Bruce Philip
by
Albert Jacobs
ATTORNEY United States Patent Office 2,908,290
Patented Oct. 13, 1959

2,908,290
SHUT-OFF VALVE

Rodney Hamilton-Peters, Lower Kingswood, and Thomas Bruce Philip, Effingham, England, assignors to The Distillers Company Limited, Edinburgh, Scotland, a British company Application January 31, 1956, Serial No. 562,552

Claims priority, application Great Britain February 17, 1955

1 Claim. (Cl. 137—614.11)

The present invention relates to a shut-off valve, and has as an object the provision of an improved valve of this type which is particularly suitable for use in the control of fluids at low temperatures and high pressures, such as, for example, liquid carbon dioxide.

It has been found that liquid carbon dioxide rapidly causes the glands of the valves previously used therewith to wear and consequently leak in a comparatively short space of time. This appears to be due partly to the formation of ice crystals which act as an abrasive and destroy the gland and partly due to the very low viscosity of liquid carbon dioxide.

Glandless valves are known and are useful for many purposes, but available types have not been found satisfactory for use in connection with the control of liquid carbon dioxide. These types of glandless valves commonly contain a resilient diaphragm of rubber or similar material which is forced down over the inlet orifice to the valve by means of mechanical pressure applied to a relatively small area. When such valves are used to control fluid flow at low temperatures and at pressures of the order of 1,000 lbs. per square inch the life of the diaphragm is extremely short.

According to the present invention there is provided a shut-off valve of the diaphragm type characterised in that the inlet to the body of the valve comprises a foraminous portion, the surface of which is adapted to be sealed by the diaphragm, the diaphragm being actuated by pressure developed in a substantially incompressible medium which is on the opposite side of the diaphragm to the inlet and outlet orifices and is capable of transmitting fluid pressures, the valve being provided with means substantially to prevent extrusion of the diaphragm into the outlet orifice when pressure is developed in the medium.

The foraminous inlet portion of the valve is suitably formed by a plug of sintered metal or other similar material which is fixed into the inlet orifice of the valve and which extends toward the interior of the valve body sufficiently for the valve to be closed to the passage of fluid when pressure is applied to the diaphragm, causing the latter to press against the surface of the foraminous portion. The surface of the foraminous portion is conveniently arranged to be approximately flush with the interior of the valve at this point. It is convenient to secure the foraminous portion in such a manner that it may be removed for cleaning or renewal as necessary.

Very efficient forms of sintered plugs can be made from Phosphor bronze and stainless steel, these usually being formed by heating together granules of the metal in a former. The pore size of such plugs is determined by the size of the granules so heated, and a wide range of pore sizes is suitable in plugs for use in the present invention, for example 0.001″ to about 0.010″ means diameter. A pore size of about 0.005 has been found very effective in use with liquid carbon dioxide, since some filtering action is provided by such dimensions. In larger valves of the present type the foraminous portion may consist of a flat piece of material having perforations therein, for example up to about 0.050″ mean diameter. In all cases the governing consideration is that the pores and perforations shall not be so large as to allow the diaphragm to extrude through when pressure is applied.

The diaphragm of the valve must be made from material which remains resilient at the temperatures at which the valve is to be operated. For some fluids it may be made of rubber, either natural or synthetic, or rubber insertion, but in the case of valves used for liquid carbon dioxide natural rubber and some synthetic rubbers absorb carbon dioxide and are thus not suitable for use in this case. Where liquid carbon dioxide is to be controlled the diaphragm may be made from certain polymeric materials such as linear polyethylene, or rubber diaphragms faced with such materials may be used. Stainless steel diaphragms may also be used with advantage in some cases.

The medium actuating the diaphragm may be either a true liquid, or any other substance capable of transmitting fluid pressures and which is substantially incompressible, such as, for example, natural rubber or synthetic rubbers or high viscosity silicone fluids such as are commercially available. It is, of course, necessary that the material used should possess the property of transmitting fluid pressures and being substantially incompressible at the temperature at which the valve is to be operated, and rubbers and high viscosity silicone fluids have been found to be very suitable for use with liquid carbon dioxide. The use of such materials enables the pressure to be applied by means of a screw type plunger which need only have a very simple form of gland. If the medium is a rubber then a close fitting plunger without a gland is satisfactory. If the chosen medium is not of sufficiently high viscosity under the conditions of operation a simple gland must be provided to seal the screw-type plunger. Alternatively the pressure may be applied by means of a piston type plunger similar to that used in many hydraulic systems, the pressure being transmitted by a fluid of moderate viscosity. The plunger in such cases, may, of course, be situated at a point remote from the body of the valve, if desired.

The means for preventing extrusion of the diaphragm into the outlet orifice when pressure is applied to the latter may conveniently consist of a foraminous portion, such as a sintered metal insert similar to that used in the inlet and similarly positioned to be sealed by the diaphragm. Alternatively, a metal plate, which may, if desired, be spring loaded, can be arranged to close the outlet in such a manner that when pressure is applied to the diaphragm, the diaphragm will bear upon the metal plate rather than upon the sides of the orifice and by this means the diaphragm is supported above the outlet. The sides of the outlet orifice may conveniently be recessed to receive the plate, thus giving a flat surface over the outlet orifice. If such a provision is not made to the outlet of the valve the diaphragm tends to be extruded into the outlet orifice and the life of the diaphragm is considerably decreased.

The drawings accompanying the specification illustrate two of the forms the invention may take.

Figure 1 is a sectional view of a valve having a screw-type of plunger operating directly on tightly packed layers of rubber backing the diaphragm.

Figure 2 is a sectional view of a valve having a liquid backing medium to the diaphragm, the pressure being transmitted by the liquid from a remote piston-type plunger acting on the liquid.

In Figure 1, the foraminous inlet portion 1, consisting of a sintered metal compact, is sealed into the inlet aperture, 2, in the lower part of the valve body, 3, which carries the outlet, 4, also containing a sintered compact, 5. The upper part of the valve body is completely filled by five layers of rubber sheet, 6, and a polyethylene diaphragm, 7. The plunger, 8, can be screwed into the threaded cylinder, 9, attached to the upper part of the valve body thereby deforming the layers of rubber and causing the diaphragm to close the sintered compacts.

In Figure 2, the sintered compact 1a is removable, being located in a tapered housing, 2a, by means of the perforated plate, 10a, the spacing ring, 11a, and the flanged inlet tube, 12a. Furthermore, the diaphragm, 7a, is backed by a silicone fluid, 13a, and the upper part of the valve body is connected by pipeline to the remotely situated control cylinder, 9a, carrying the piston-type plunger 8a. The cylinder, pipeline and upper part of the valve body are all completely filled with the silicone fluid. The means to prevent damage to the diaphragm consist of the associated spring and cover plate, 5a, which is forced into its seating when pressure is applied to the diaphragm. The cover plate is not such a close fit in the seating as to prevent the spring opening it again against the pressure of the liquid or gas when the pressure exerted by the diaphragm is removed.

An advantage shown by the valve of this invention additional to those advantages which will be at once apparent from the foregoing description is that, should the line between the valve and the point of use of the fluid become disconnected or ruptured, free escape of the fluid is restricted to a large extent by the foraminated inlet portion of the valve. In fact a sintered compact can be used for the inlet, and also if desired for the outlet, of the valve which will pass the required flow without undue pressure drop but will restrict the flow to twice this rate, or even less, if the line is disconnected. For instance, a valve being used in the liquid carbon dioxide supply to a capillary tube for supplying coolant to a lathe may contain sintered compacts rated at 40–50 lbs./hour of liquid carbon dioxide at 900 lbs./square inch while as much as 25–30 lbs./hour of carbon dioxide may be delivered by the capillary tube with only a small pressure drop in the valve.

We claim:

A shut-off valve comprising a body portion, a diaphragm and a substantially incompressible medium, capable of transmitting fluid pressure disposed therein and enclosed thereby, and a mechanism for exerting pressure on the said medium on one side of the diaphragm, and the body portion having inlet and outlet orifices on the opposite side of the diaphragm, the inlet orifice to the valve being provided with a porous foraminous insert, the surface of which is adapted to be sealed by the diaphragm when pressure is exerted upon the substantially incompressible medium, and the outlet orifice being provided with a spring-loaded plate member which seats on the outlet orifice and prevents extrusion of the diaphragm into the outlet orifice when the diaphragm bears upon its surface and which disengages from the outlet orifice when the diaphragm is withdrawn.

References Cited in the file of this patent

UNITED STATES PATENTS

| | | |
|---|---|---|
| 395,334 | Kirkpatrick | Jan. 1, 1889 |
| 1,158,869 | Thomson | Nov. 2, 1915 |
| 2,407,761 | McPherson | Sept. 17, 1946 |
| 2,517,061 | Stackelberg | Aug. 1, 1950 |
| 2,615,670 | Nelson | Oct. 28, 1952 |
| 2,622,619 | Grove | Dec. 23, 1952 |
| 2,630,834 | Weber | Mar. 10, 1953 |
| 2,654,559 | Franck | Oct. 6, 1953 |
| 2,666,278 | Matasovic | Jan. 19, 1954 |
| 2,750,959 | Seggern | June 19, 1956 |

FOREIGN PATENTS

| | | |
|---|---|---|
| 972 | Great Britain | Apr. 5, 1865 |
| 51,686 | Switzerland | Mar. 15, 1910 |